United States Patent [19]  
Kawakubo et al.

[11] Patent Number: 4,618,653  
[45] Date of Patent: Oct. 21, 1986

[54] NOVEL POLYMER AND CURED PRODUCT OF THE SAME

[75] Inventors: Fumio Kawakubo; Miyako Takanoo; Sadao Yukimoto; Katsuhiko Isayama, all of Kobe, Japan

[73] Assignee: Kanegafuchi Chemical Industry Co., Ltd., Japan

[21] Appl. No.: 727,296

[22] Filed: Apr. 25, 1985

[30] Foreign Application Priority Data

Apr. 26, 1984 [JP] Japan ................................ 59-84849

[51] Int. Cl.$^4$ .................... C08L 71/02; C08F 283/06
[52] U.S. Cl. .................................. 525/404; 525/254; 525/403; 525/445; 525/446; 525/479; 525/529
[58] Field of Search ............... 525/404, 254, 403, 445, 525/529, 479

[56] References Cited

U.S. PATENT DOCUMENTS

| | | | |
|---|---|---|---|
| 3,632,399 | 1/1972 | Burlant et al. | 525/445 |
| 3,990,459 | 11/1976 | Papantoniou | 525/404 |
| 4,032,599 | 6/1977 | Cordrey et al. | 525/404 |
| 4,302,571 | 11/1981 | Arai et al. | 525/404 |
| 4,368,290 | 1/1983 | Alberts et al. | 525/404 |
| 4,543,390 | 9/1985 | Tanaka et al. | 525/404 |
| 4,568,705 | 2/1986 | Grace et al. | 525/404 |

FOREIGN PATENT DOCUMENTS 0063492  6/1978  Japan .................................. 525/254

Primary Examiner—Wilbert J. Briggs, Sr.  
Attorney, Agent, or Firm—Wegner & Bretschneider

[57] ABSTRACT

A polymer which is prepared by polymerizing at least one polymerizable monomer in the presence of an organic polymer having a reactive silicone group and a polymerizable ethylenically unsaturated group in a molecule, the total number of the silicone group and the unsaturated group being on the average not less than 1.1 and the number of the ethylenically unsaturated group being on the average not less than 0.1 by use of a radical polymerization initiator having a reactive silicone group and/or a chain transfer agent having a reactive silicone group, which is cured with moisture to give a product having improved properties such as tensile properties and weather resistance.

14 Claims, No Drawings

NOVEL POLYMER AND CURED PRODUCT OF THE SAME

FIELD OF THE INVENTION

The present invention relates to a novel polymer and a cured product of the same. More particularly, it relates to a novel polymer which is cured with moisture to give an elastomeric or resinous material with improved tensile strength.

BACKGROUND OF THE INVENTION

Japanese Patent Kokai Publication (unexamined) No. 78223/1984 discloses a novel polymer prepared by polymerizing an ethylenically unsaturated compound in the presence of an organic polymer having at least one reactive silicone group in a molecule. This polymer has superior properties to those of the organic polymer having at least one reactive silicone group in a molecule. Particularly, the polymer the backbone of which is polyether has significantly improved weather resistance. However, the tensile properties of the cured material of the polymer are not satisfactorily improved. For example, elongation at break of the cured polymer is inferior to that of the organic polymer having at least one reactive silicone group in a molecule. Inferior elongation restricts application fields of the polymer and, for example, it cannot be practically used as a sealing material, which is one of important application fields of the organic polymer having at least one reactive silicone group in a molecule.

SUMMARY OF THE INVENTION

One object of the present invention is to provide a novel polymer which is cured with water or moisture to give an elastomeric or resinous material with improved tensile properties, particularly elongation at break.

Another object of the present invention is to provide a novel polymer prepared by polymerizing a ethylenically unsaturated monomer in the presence of an organic polymer having at least one reactive silicone group in a molecule.

Further object of the present invention is to provide a curing composition comprising the novel polymer of the invention and a cured product thereof.

DETAILED DESCRIPTION OF THE INVENTION

According to the present invention, there is provided a polymer which is prepared by polymerizing at least one polymerizable monomer in the presence of an organic polymer having a reactive silicone group and a polymerizable ethylenically unsaturated group in a molecule, the total number of the silicone group and the unsaturated group in a molecule being on the average not less than 1.1 and the number of the ethylenically unsaturated group being on the average not less than 0.1 by use of a radical polymerization initiator having a reactive silicone group and/or a chain transfer agent having a reactive silicone group. Preferably, the amount of the initiator and/or the chain transfer agent is from 0.01 to 20 parts by weight, preferably from 0.5 to 10 parts by weight based on 100 parts by weight of the polymerizable monomer.

The organic polymer having at least one reactive silicone group and at least one polymerizable ethylenically unsaturated group in a molecule is prepared by one of methods described in following Japanese Patent Publications:

Japanese Patent Publication Nos. 36319/1970, 12154/1971 and 32673/1974 and Japanese Patent Kokai Publication (unexamined) Nos. 156599/1975, 73561/1976, 6096/1979, 13767/1980, 13768/1980, 82123/1980, 123620/1980, 125121/1980, 131021/1980, 131022/1980, 135135/1980, 137129/1980, etc. In addition, the organic polymer can be a polyalkylenedioxide having unsaturated groups in side chains which is introduced by polycondenstion of an epoxy compound having an ethylenically unsaturated group (e.g. allyl glycidyl ether, etc.). Preferred examples of the organic polymer used in the present invention are those having a backbone chain consisting of a polyalkyleneoxide, a polyester and an ether-ester block copolymer and a molecular weight of 500 to 30,000. Most preferred is the organic polymer having a backbone chain of a polyalkyleneoxide and a molecular weight of 3,000 to 15,000 in which the reactive silicone group is bonded to at least one terminal carbon atom of the molecule.

The reactive silicone group used herein is intended to mean a group which effects a condensation reaction in the presence of moisture or a cross linking agent and optionally a catalyst. Examples of such group are a group containing a silicone atom which bonds to a hydrolyzable group, a silanol group and preferably a group of the formula:

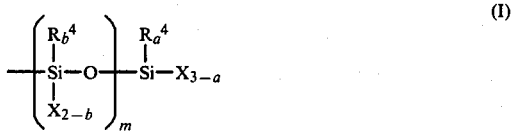
(I)

wherein $R^4$ is a $C_1$–$C_{20}$ alkyl, a $C_6$–$C_{20}$ aryl, a $C_7$–$C_{20}$ aralkyl group or a triorganosiloxane group of the formula:

(X)

wherein $R''$ is, the same or different, $C_1$–$C_{20}$ hydrocarbon group, X is a hydroxyl group or, the same or different, a hydrolyzable group, a is 0, 1, 2 or 3, b is 0, 1 or 2, and m is an integer of 0 to 18. The hydrolyzable group X is, for example, a halogen atom, a hydride group, an alkoxy group, an acyloxy group, a ketoximate group, an amino group, an amide group, an aminoxy group, a mercapto group, an alkenyloxy group, etc. In view of influence on condensation reaction and/or handling easiness, an alkoxy group is preferred. As the substituent $R^4$, a methyl group and a phenyl group are more preferred because of their availability. The reactive silicone group is preferably linked to the organic polymer through a Si-C linkage.

Preferably, the polymerizable ethylenically unsaturated group may be a group of the formula:

(II)

wherein Z is a divalent $C_1$–$C_{40}$, preferably $C_1$–$C_{20}$ organic group, preferably —R—, —ROR—, —ROCO—, —RNHCO—, —RCO— and —CO— in which R is each $C_1$–$C_{20}$ hydrocarbon group, particularly a methylene group, R' is a hydrogen atom or the substituted or unsubstituted $C_1$-$C_{20}$ organic group, preferably a hydrogen atom or a hydrocarbon group, particularly, a hydrogen atom, and c is 0 or 1, and its specific examples are $CH_2=CHO$—, $CH_2=C(CH_3)CH_2O$—,

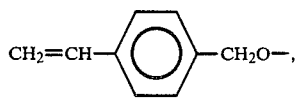

$CH_2=CHCH_2OCH_2O$—, $CH_2=CHCOO$—, $CH_2=C(CH_3)COO$—, etc.

The organic polymer having the reactive silicone group may be prepared by reacting, according to a so-called hydrosilylation reaction, a hydrogenated silicone compound of the formula:

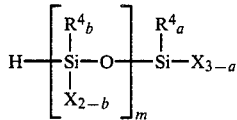

(III)

wherein $R^4$, X, a, b and m are the same as defined above and a polyalkyleneoxide having an ethylenically unsaturated group (II) in the presence of a platinum catalyst (e.g. chloroplatinic acid, etc.). In the present invention, the amount of the hydrogenated silicone compound (III) should be so selected that molar amount of the compound (III) is not larger than that of the unsaturated group (II), and a molecule has on the average at least 0.1 unsaturated group.

Other methods for preparing the organic polymer having the reactive silicone group are as follows:

(1) Polyisocyanate compound such as toluenediisocyanate is reacted with a polyalkyleneoxide having terminal hydroxyl groups to produce a polyalkyleneoxide having terminal isocyanate groups, which are subsequently reacted with an active hydrogen-containing group W of a silicone compound of the formula:

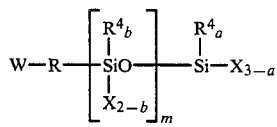

(IV)

wherein W is an active hydrogen-containing group selected from the group consisting of a hydroxyl group, a carboxyl group, a mercapto group and a primary or secondary amino group, and $R^4$, R, X, a, b, and m are the same as defined above, and a group W of a compound of the formulas:

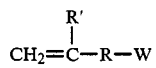

(V)

and

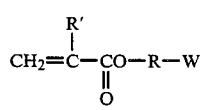

(VI)

wherein R', W and R are the same as defined above.

(2) The ethylenically unsaturated group of the polyalkyleneoxide (III) is reacted with the mercapto groups of the silicone compound (IV) and the compound (V) wherein W is the mercapto group.

(3) The terminal hydroxyl group of the polyalkyleneoxide is reacted with a silicone compound of the formula:

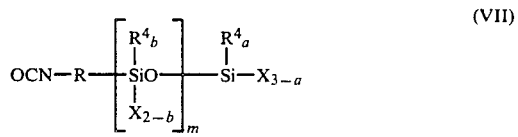

(VII)

wherein $R^4$, R, X, a, b and m are the same as defined above, and a compound of the formulas:

(VIII)

and

(IX)

wherein R' and R are the same as defined above. The present invention is not limited to the above methods.

Each $R^4$ in the formulas is, the same or different, a monovalent $C_1$-$C_{20}$ hydrocarbon group, and its specific examples are an alkyl group (e.g. methyl, ethyl, etc.), a cycloalkyl group (e.g. cyclohexyl, etc.), an aryl group (e.g. phenyl, etc.) and an aralkyl group (e.g. benzyl, etc.). $R^4$ may stand for a triorganosiloxane group of the formula:

$(R'')_3SiO$— (X)

wherein R'' is the same as defined above.

Specific examples of the hydrogenated silicone compound (III) are halogenated silanes (e.g. trichlorosilane, methyldichlorosilane, dimethylchlorosilane, trimethylsiloxydichlorosilane, etc.), alkoxysilanes (e.g. trimethoxysilane, triethoxysilane, methyldiethoxysilane, phenyldimethoxysilane, 1,3,3,5,5,7,7-heptamethyl-1,1-dimethoxytetrasiloxane, etc.), acyloxysilanes (e.g. methyldiacetoxysilane, trimethylsiloxymethylacetoxysilane, etc.), ketoximatesilanes (e.g. bis(dimethylketoximate)methylsilane, bis(cyclohexylketoximate)methylsilane, bis(diethylketoximate)trimethylsiloxysilane, etc.), hydrosilanes (e.g. dimethylsilane, trimethylsiloxymethylsilane, 1,1-dimethyl-2,2-dimethyldisiloxane, etc.), and alkenyloxysilanes (e.g. methyldi(isopropenyloxy)silane, etc.).

In the reaction of the hydrogenated silicone compound (III) and the polyalkyleneoxide (II), a part or all of X groups may be converted to other hydrolyzable group(s) or a hydroxyl group(s). For example, when X is halogen atom or the hydride group, it is preferably converted to an alkoxy group, an acyloxy group, an aminoxy group, an alkenyloxy group, a hydroxyl group, etc.

The polyalkyleneoxide having the group (II) may be prepared by a method disclosed in Japanese Patent Kokai Publication (unexamined) No. 6097/1979 or a method comprising introducing the ethylenically unsaturated group by copolymerizing an epoxy compound (e.g. ethyleneoxide, propyleneoxide, etc.) with an epoxy compound having an ethylenically unsaturated group (e.g. allyl glycidyl ether, etc.).

Preferably, the main chain of the polyalkyleneoxide to be used in the invention comprises repeating units of the formula:

$$-R^1-O- \quad (XI)$$

wherein $R^1$ is a $C_1C_8$ divalent organic group, preferably most of $R^1$ are $C_1-C_4$ hydrocarbon groups. Specific examples of $R^1$ are $-CH_2-$, $-CH_2CH_2-$, $-CH(CH_3)CH_2-$, $-CH(C_2H_5)CH_2-$, $-C(CH_3)_2CH_2-$, $-CH_2CH_2CH_2CH_2-$, etc. The main chain of the polyalkyleneoxide may comprise one or more kinds of the repeating units. Among them, $-CH(CH_3)CH_2-$ is most preferred. The molecular weight of the polyalkyleneoxide is preferably from 500 to 30,000, more preferably from 3,000 to 15,000.

The organic polymer having the reactive silicone group may be used alone or a mixture of two or more kinds of the polymers. In addition, a mixture containing 50% by weight or more of the polymer may be used. The amount of the organic polymer having the reactive silicone group is preferably from 10 to 1,000 parts by weight, especially from 30 to 300 parts by weight based on 100 parts by weight of the ethylenically unsaturated monomer.

The ethylenically unsaturated monomer to be used in the invention is one or more monomers selected from the groups consisting of an ethylenically unsaturated compound of the formula:

$$CH_2=C\begin{matrix}R^2\\ \\R^3\end{matrix} \quad (XII)$$

wherein $R^2$ is a hydrogen atom, a halogen atom or a substituted or unsubstituted monovalent $C_1-C_{10}$ hydrocarbon group, and $R^3$ is a hydrogen atom, a halogen atom, a substituted or unsubstituted monovalent $C_1-C_{10}$ hydrocarbon group, a substituted or unsubstituted monovalent aromatic group, an alkenyl group, a carboxyl group, an acyloxy group, an alkoxycarbonyl group, a nitrile group, a pyridyl group, an amide group or a glycidoxy group, and an ethylenically unsaturated compound of the formula:

$$R^5\!-\!\!\left[\begin{matrix}R^4_b\\ |\\ Si-O\\ |\\ X_{2-b}\end{matrix}\right]_m\!\!\begin{matrix}R^4_a\\ |\\ Si-X_{3-a}\end{matrix} \quad (XIII)$$

wherein $R^4$, X, a, b and m are the same as defined above and $R^5$ is an organic group having an ethylenically unsaturated group.

Specific examples of the ethylenically unsaturated compound (XII) are ethylene, propylene, isoprene, butadiene, chloroprene, vinyl chloride, vinylidene chloride, acrylic acid, methacrylic acid, vinyl acetate, acrylonitrile, pyridine, styrene, chlorostyrene, 2-methylstyrene, divinylbenzene, methyl acrylate, ethyl acrylate, isobutyl acrylate, 2-ethylhexyl acrylate, 2-hydroxyethyl acrylate, benzyl acrylate, glycidyl acrylate, methyl methacrylate, ethyl methacrylate, isobutyl methacrylate, 2-ethylhexyl methacrylate, 2-hydroxyethyl methacrylate, benzyl methacrylate, glycidyl methacrylate, acrylamide, methacrylamide, n-methylolacrylamide, etc.

Among these monomers, an acrylate or methacrylate monomer of the formula:

$$CH_2=C\begin{matrix}R^2\\ \\C-O-R^6\\ \|\\ O\end{matrix} \quad (XIV)$$

wherein $R^2$ is the same as defined above and $R^6$ is a substituted or unsubstituted $C_1-C_{20}$ monovalent aliphatic or aromatic group is preferred. Preferably, $R^2$ is a hydrogen atom or a methyl group, and a substituted or unsubstituted monovalent hydrocarbon group of $R^6$ is methyl, ethyl, propyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, 2-ethylhexyl, decyl, dodecyl, 2-hydroxyethyl, 2-hydroxypropyl, diaminoethyl, diethylaminoethyl, glycidyl, tetrahydrofurfuryl, benzyl, etc., and preferably n-butyl and 2-ethylhexyl. Monomeric mixture containing at least 50% by weight of the above acrylate of methacrylate monomer is preferred.

Specific examples of the ethylenically unsaturated compound (XIII) are as follows:

$$CH_2=CHSi(OCH_3)_2,\ \ CH_2=CHSi(OCH_2CH_3)_2,$$
$$\phantom{xxxxxx}\overset{CH_3}{|}\phantom{xxxxxxxxxxx}\overset{CH_3}{|}$$

$$CH_2=CH-\underset{\underset{CH_3}{|}}{\overset{\overset{CH_3}{|}}{Si}}-O-\underset{}{\overset{\overset{CH_3}{|}}{Si}}(OCH_3)_2,\ \ CH_2=CHSiCl_2,$$

$$CH_2=CHSi(OCH_3)_3,\ CH_2=CHSi(OCH_2CH_3)_3,\ CH_2=CHSiCl_3,$$

$$CH_2=CH\overset{O}{\overset{\|}{C}}O(CH_2)_3\overset{\overset{CH_3}{|}}{Si}(OCH_3)_2,$$

$$CH_2=CH\overset{O}{\overset{\|}{C}}O(CH_2)_3\overset{\overset{CH_3}{|}}{Si}O-\underset{\underset{CH_3}{|}}{Si}(OCH_3)_2,$$

$$CH_2=CH\overset{O}{\overset{\|}{C}}O(CH_2)_3\overset{\overset{CH_3}{|}}{Si}(OCH_2CH_3)_2,\ \ CH_2=CH\overset{O}{\overset{\|}{C}}O(CH_2)_3\overset{\overset{CH_3}{|}}{Si}Cl_2,$$

$$CH_2=CH\overset{O}{\overset{\|}{C}}O(CH_2)_3Si(OCH_3)_3,$$

$$CH_2=CH\overset{O}{\overset{\|}{C}}O(CH_2)_3Si(OCH_2CH_3)_3,\ \ CH_2=CH\overset{O}{\overset{\|}{C}}O(CH_2)_3SiCl_3,$$

$$CH_2=\overset{\overset{CH_3}{|}}{C}-\overset{O}{\overset{\|}{C}}O(CH_2)_3\overset{\overset{CH_3}{|}}{Si}(OCH_3)_2,$$

$$CH_2=\overset{\overset{CH_3}{|}}{C}-\overset{O}{\overset{\|}{C}}O(CH_2)_3\overset{\overset{CH_3}{|}}{Si}(OCH_2CH_3)_2,\ \ CH_2=\overset{\overset{CH_3}{|}}{C}-\overset{O}{\overset{\|}{C}}O(CH_2)_3\overset{\overset{CH_3}{|}}{Si}Cl_2,$$

$$CH_2=\overset{\overset{CH_3}{|}}{C}-\overset{O}{\overset{\|}{C}}O(CH_2)_3Si(OCH_3)_3,$$

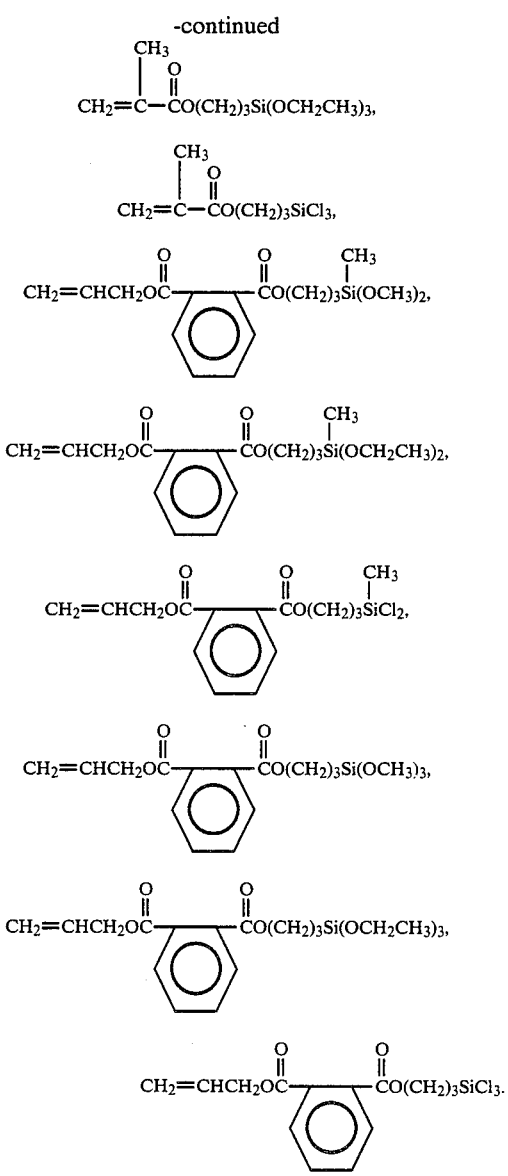

Among them,

CH₂=C(CH₃)—CO(CH₂)₃Si(OCH₃)₃ and

CH₂=C(CH₃)—CO(CH₂)₃Si(OCH₃)₂(CH₃)

are more preferred.

A compound having at least two independent ethylenically unsaturated functional groups in a molecule may be used together with the ethylenically unsaturated monomer. The unsaturated group in the compound may be a group of the formula:

$$CH_2=C(R')-Z-$$

wherein R' and Z are the same as defined above.

Specific Examples of the compound having at least two independent ethylenically unsaturated functional groups in a molecule (hereinafter referred to as "polyfunctional monomer") used in the invention are neopentylglycol diacrylate and dimethacrylate, 1,5-pentanediol diacrylate and dimethacryalate, 1,6-hexanediaol diacrylate and dimethacrylate, polyethyleneglycol diacrylate and dimethacrylate, polypropyleneglycol diacrylate and dimethacrylate, divinylbenzene, silicone compounds having at least two ethylenically unsaturated groups in the molecule which may be used as starting materials of so-called addition type silicones, such as a methacrylate ester of polybutadiene having terminal hydroxyl groups (e.g. NISSO-PB (trade name) TE2000 manufactured by Nippon Soda), a reaction product of polyfunctional epoxy compound with an equimolar amount of acrylic or methacrylic acid such as a reaction product of polyester having a terminal hydroxyl group with an equimolar amount of acrylic or methacrylic acid such as

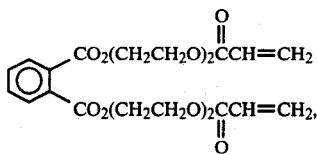

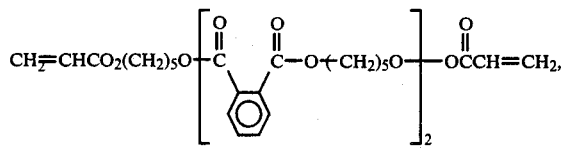

a reaction product of polyurethane having terminal hydroxyl groups with acrylic or methacrylic acid in an equimolar amount with the terminal hydroxyl groups, diallyl o-phthalate and isophthalate, allyl acrylate and methacrylate, methylenebisacrylamide,

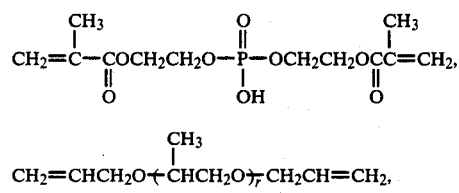

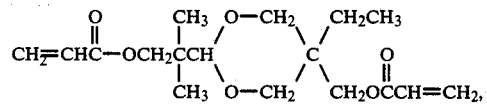

(cf. Japanese Patent Kokai Publication Nos. 13496/1975, 149797/1975, 136583/1978 and 13768/1980), trimethylolpropane triacrylate and methacrylate, pentaerythritol acrylate and methacrylate, triacrylate and trimethacrylate of tris(2-hydroxyethyl)isocyanuric acid, triallyl cyanurate, tetramethylolmethane tetraacrylate and tetramethacrylate,

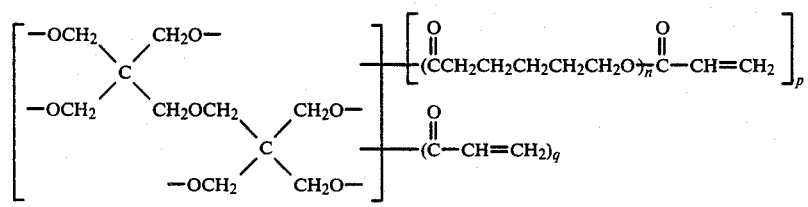

(Trade name:
  DPCA-20 (n=1, p=2, q=4)
  DPCA-30 (n=1, p=3, q=3)
  DPCA-60 (n=1, p=6, q=0)
  DPCA-120 (n=2, p=6, q=0)
manufactured by Nippon Kayaku), diallyl phthalate polymer (e.g. Daisodap L (trade name) manufactured by Osaka Soda), polybutadiene-1,2 (NISSO-PB (trade name) manufactured by Nippon Soda), etc.

When the number of the ethylenically unsaturated group in the organic polymer having the reactive silicone group is small, the addition of the polyfunctional monomer further improves the tenisle strength of the cured polymer.

The polyfunctional monomer may be used alone or as a mixture of two or more kinds of the compounds. The amount of the compound is preferably from 0.5 to 50 parts by weight, more preferably from 1 to 10 parts by weight based on 100 parts by weight of the ethylenically unsaturated monomer. When the compound is used in a too large amount, the polymer tends to be gelled depending on the amounts of the chain transfer agent and the radical initiator and/or the presence of the solvent.

Preferred radical polymerization initiator having the reactive silicone group is an azo compound or a peroxide having a reactive silicone group of the formula:

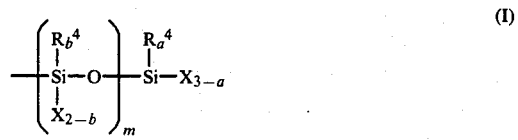

wherein $R^4$, X, a, b and m are the same as defined above. The azo type initiator may be represented by the formula:

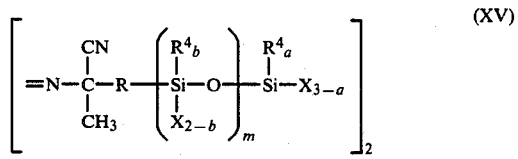

wherein $R^4$, R, X, a, b and m are the same as defined above, preferably X is an alkoxy group such as a methoxy group and an ethoxy group. Preferred examples of the azo compound are as follows:

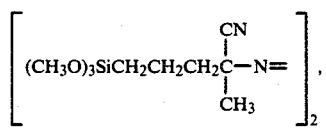

,

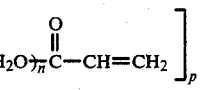

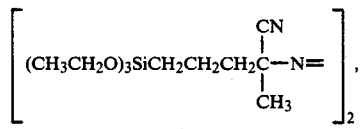

,

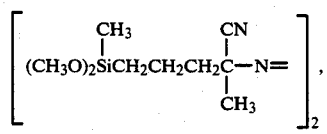

,

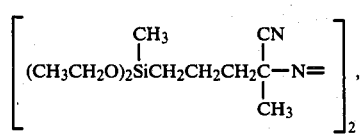

,

-continued

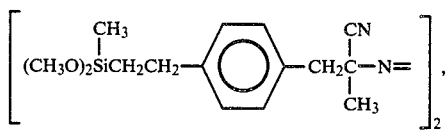

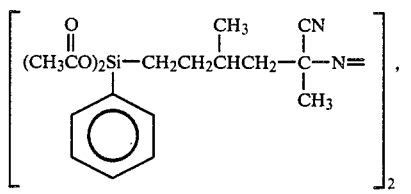

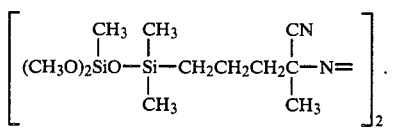

Specific examples of the peroxide type radical initiator are as follows:

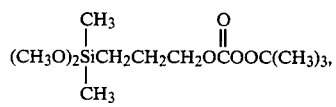

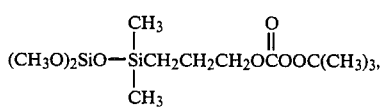

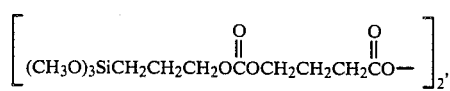

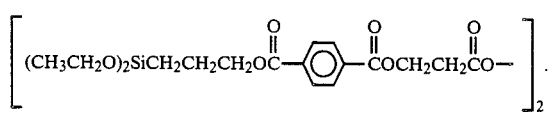

Preferred chain transfer agent has a reactive silicone group (I) and may be represented by the formulas:

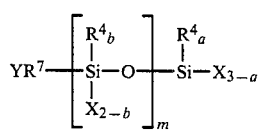    (XVI)

and

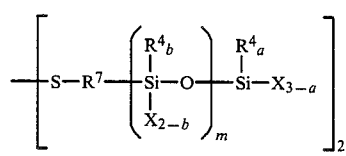    (XVII)

wherein $R^4$, X, a, b and m are the same as defined above, and $R^7$ is a $C_1$-$C_{20}$ divalent saturated hydrocarbon group and Y is a group which imparts a chain transfer constant larger than $10^{-3}$ to the compound (XII) and is to be activated by a free radical. Y may be a mercapto group, bromine atom or an amino group, and preferably a mercapto group.

Specific examples of the chain transfer agent are as follows:

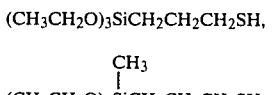

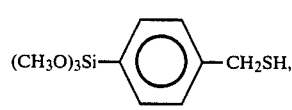

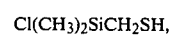

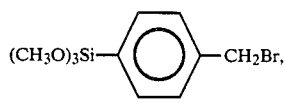

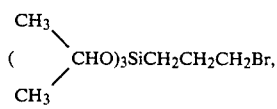

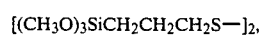

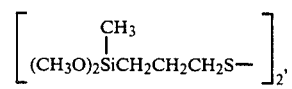

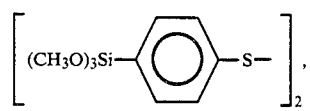

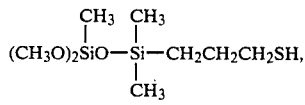

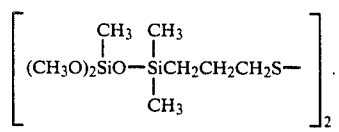

The polymerization according to the present invention can be carried out in a conventional manner. For example, the polymerization may be initiated by a radical initiator other than the above described radical initiator having the reactive silicone group, or by irradiation with ultraviolet, X-ray or gamma-ray. Examples of other radical initiator are peroxides (e.g. benzoyl peroxide, benzoyl hydroperoxide, di-t-butyl peroxide, di-t-butyl hydroperoxide, acetyl peroxide, lauroyl peroxide, hydrogen peroxide, etc.), azo compounds (e.g. azobisisobutyronitrile, etc.) and peroxide compounds (e.g. persulfuric acid, diisopropyl peroxydicarbonate, etc.).

The polymerization may be carried out in a solvent which is preferably inactive with the ethylenically unsaturated monomer as well as the organic polymer having the reactive silicone group. Specific examples of the solvent are ethers (e.g. diethyl ether, methyl ethyl ether, methylcellosolve, ec.), hydrocarbons (e.g. pentane, hexane, heptane, etc.), acetates (e.g. methyl acetate, ethyl acetate, butyl acetate, etc.), etc.

The polymerization temperature is not critical in the invention. When the polymerization is initiated by the initiator, it depends on the kind of the initiator, and preferably from 50° to 150° C.

In addition to the chain transfer agent having the reactive silicone group, other chain transfer agent such as thiol compounds (e.g. 1-butanethiol, 1-hexanethiol, 1-dodecanethiol, etc.), disulfide compounds (e.g. ethyldisulfide, phenyldisulfide, butyldisulfide, etc.), halogenated compounds (e.g. chloroform, carbon tetrachloride, carbon tetrabromide, etc.), amine compounds (e.g. triethylamine, tripropylamine, tributylamine, etc.), lower alcohols (e.g. ethanol, isopropanol, butano., etc.) may be used to control the polymerization degree. The ethylenically unsaturated monomer may be added in one portion, or portionwise or continuously to the polymerization system to control reaction heat.

A reason why the properties, particularly tensile strength of the polymer are improved by the present invention so that the polymer has low modulus and large elongation may be explained as follows:

When the ethylenically unsaturated monomer is polymerized in the presence of the organic polymer having the reactive silicone group and the polymerizable ethylenically unsaturated group, the organic polymer is introduced in the polymeric chain of the ethylenically unsaturated monomer as a so-called "macromer" so that the resultant polymer has a structre like a graft copolymer. In such case, when the polymerization initiator and/or chain transfer agent having the reactive silicone group are used, the reactive silicone group is introduced at the terminal carbon of the polymer of the ethylenically unsaturated monomer. As the result, the polymer comprising the molecules having a quasi-telechelic structure is produced, and the cured product of the polymer has comparatively large molecular weight between the cross-linked sites so that it has low modulus and large elongation.

The polymer of the present invention is used as an adhesive, a pressure sensitive adhesive, a coating material, a sealing material, a water-proof material, a spray covering material, a templating material, a casting material, etc., and particularly useful as the sealing material and the pressure sensitive adhesive. Especially, the polymer of the present invention prepared by using the acrylate or methacrylate monomer as the ethylenically unsaturated monomer is useful as the seling material and the pressure sensitive adhesive. When the polymer is used in the above applications, a conventionally used additive is optionally added. Examples of the additive are a reinforcement or non-reinforcement filler (e.g. white carbon, carbon black, calcium carbonate, titanium oxide, talc, asbestos, glass fiber, etc.), a plasticizer, an anti-oxidant, an ultraviolet light absorber, a pigmet, a flame retardant, etc.

When the polymer of the invention is used as the sealing material, optionally added is a plasticizer, a filler, a reinfrocement, a thickening agent, a colorant, an anti-aging agent, an adhesion promoting agent, a property modifier, etc. Specific examples of the plasticizer are phtahlates (e.g. dibutyl phthalate, diheptyl phthalate, di(2-ethylhexyl) phthalate, butyl benzyl diphthalate, butyl phthalyl butylglycolate, etc.), non-aromatic dibasic acid esters (e.g. dioctyl adipate, dioctyl sebacate, etc.), esters of polyalkylene glycol (e.g. diethylene glycol dibenzoate, triethylene glycol dibenzoate, etc.), phosphates (e.g. tricresyl phosphate, tributyl phosphate, etc.), chlorinated paraffins, hydrocarbon oils (e.g. alkyldiphenyl, partially hydrogenated terphenyl, etc.), which are used alone or as a mixture thereof. The plasticizer may be added in the course of the polymerization. Specific examples of the filler or reinforcement are heavy or light calcium carbonate, calcium carbonate surface of which is treated with an aliphatic acid, a resin acid, a cationic surfactant, an anionic surfactant, etc., magnesium carbonate, talc, titanium oxide, barium sulfate, alumina, metal powder (e.g. aluminium, zinc and iron powder), bentonite, kaolin clay, fumed silica, silica powder, and carbon black. When a transparent filler or reinforcement such as fumed silica is used, a transparent sealing material is prepared. Specific examples of the thickening agent are hydrogenated caster oil, and metal soap such as calcium stearate, aluminium stearate and barium stearate. The thickening agent may not be used depending on the end use or the compounding of the filler or reinforcement. As the colorant, conventional organic or inorganic pigment or dye may be used. Specific examples of the property modifier are silicone compounds such as alkylalkoxy silanes (e.g. methyltrimethoxysilane, dimethyldimethoxysilane, trimethylmethoxysilane, n-propyltrimethoxysilane, etc.), alkylisopropenoxysilanes (e.g. dimethyldiisopropenoxysilane, methyltriisopropenoxysilane, γ-glycidoxypropylmethyldiisopropenoxysilane, etc.), alkoxysilane having a functional group(s) (e.g. γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropyldimethoxysilane, etc.), silicone varnish, polysiloxanes, etc. Addition of the property modifier can increase or decrease the hardness of the cured polymer. The adhesivity promoting agent is not necessarily added since the polymer of the invention per se has adhesivity to surface of glass, ceramics, metals etc., or the polymer can be adhered to various surfaces by the use of a primer. Specific examples of the adhesivity promoting agent are epoxy resins, phenol resins, silane coupling agents, alkyl titanates, aromatic polyisocyanate, etc. Specific examples of the curing catalyst are titanates (e.g. tetrabutyl titanate, teterapropyl titanate, etc.), organic tin compounds (e.g. dibutyltin dilaurate, dibutyltin maleate, dibutyltin diacetate, tin caprilate, tin naphthenate, etc.), lead caprilate, amine compounds (e.g. butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(-dimethylaminomethyl)phenol, morpholine, N-methylmorpholine, 1,3-diazabicyclo[5.4.6]undecene-7 (DBU), and their salts with carboxylic acids, etc.), a low molecular weight polyamide prepared from a polybasic acid and an excess amount of polyamine, a reaction product of an epoxy compound and an excess amount of polyamine, a silanol condensation catalyst such as a silane coupling agent having an amino group (e.g. γ-aminopropyltrimethoxysilane, N-(β-aminoethyl)aminopropylmethyldimethoxysilane, etc), and a mixture thereof.

To improve processability of the polymer and/or to reduce the viscosity of the polymer, a solvent may be used. Specific examples of the solvent are aromatic hydrocarbons (e.g. toluene, xylene, etc.), esters (e.g. ethyl acetate, butyl acetate, amyl acetate, cellosolve acetate, etc.), and ketones (e.g. methyl ethyl kotone, methyl isobutyl ketone, diisobutyl ketone, etc.). The solvent may be used in the polymerization step.

The anti-ageing agent is not necessarily added to the polymer. When used, the antioxidant or the ultraviolet absorbing agent is preferably used.

The sealing material comprising the polymer of the invention may be formulated as a moisture curing one-pack type one by compounding all the components and stored in a sealed state. Alternatively, the sealing material may be formulated as a two-pack type one consisting of the polymer composition and a curing mixture containing the curing catalyst, the filler, the plasticizer, water and other suitable components except the polymer, which are mixed in use.

In case of the one-pack type sealing material, since all the components are beforehand compounded, preferably, any component including water or moisture should be dehydrated before compounding, or the components are compounded with removing water or moisture, for example, under reduced pressure.

In case of the two-pack type one, since the polymer composition does not contain any curing catalyst, either the polymer composition and the curing mixture may contain a slight amount of water or moisture. However, for longer storage of the sealing material, it is preferably dehydrated. Solid components such as powder may be heated to dehydrate, and liquid components may be dehydrated under reduced pressure or with a desiccant such as synthetic zeolites, active alumina and silica gel. Alternatively or in addition, water or moisture can be removed by adding a small amount of isocyanate compound to react the isocyante groups with water or moisture. In addition, storage stability of the sealing material is improved by the addition of lower alcohols (e.g. methoanol, ethanol, etc.) or alkoxysilane (e.g. n-propyltrimethoxysilane, vinylmethyldimethoxysilane, γ-mercaptopropylmethyldimethoxysilane, γ-glycidoxypropyltrimethoxysilane, etc.).

When the polymer of the invention is to be used as the pressure sensitive adhesive, the same curing catalyst, the anti-ageing agent, the plasticizer, the reinforcement, the property modifier, the solvent, etc. as used in the sealing material may be used. For certain some final uses, the pressure sensitive adhesive may contain a conventionally used additive such as rosin ester resin, phenol resin, xylene resin, xylene-phenol resin, cumarone resin, petroleum resin including aromatic, resin-/aromatic copolymer and alicyclic one, terpene resin, terpene-phenol resin, low molecular weight polystyrene, etc. The pressure sensitive adhesive according to the present invention may be used in the same way as the conventional pressure sensitive adhesive and is applied on a substrate such as tape, a sheet, a label and a foil. For example, the pressure sensitive adhesive according to the present invention as such or in the form of a solution, an emulsion or a hot-melt type may be applied on a film of a synthetic resin or a modified natural material, paper, fabrics, metal foils, metallized plastic foils, asbestos or glass fiber fabrics and cured at a room temperature or an elevated temperature with exposure to water or moisture.

The invention will be hereinafter explained further in detail by following Examples.

PREPARATION EXAMPLE 1

To a reactor, a propyleneoxide polymer having terminal groups 95% of which are $CH_2=CHCH_2O-$ (100 g. Average molecular weight, 8,000), dimethoxymethylsilane (1.77 g), a 10% by weight solution of $H_2PtCl_6.6H_2O$ in isopropanol (0.013 g) were charged and reacted at 80° C. for 4 hours. The reaction was terminated when disappearance of a peak near 2,100 $cm^{-1}$ corresponding to absorption by Si—H bondings in IR spectrum was confirmed, the reaction was terminated. Iodide number of the product was 2.0, from which it was found that the resultant polymer had on the average 1.2 reactive silicone groups and 0.6 polymerizable ethylenically unsaturated group per molecule.

PREPARATION EXAMPLE 2

In the same manner as in Preparation Example 1 but using 0.8 g of dimethoxymethyl silane, the reaction was carried out to obtain a polymer having 0.6 reactive silicone group and 1.2 polymerizable ethylenically unsaturated groups per molecule.

EXAMPLE 1

The polymer produced in Preparation Example 1 (100 g) was charged in a reactor and evacuated under reduced pressure. After replacing the interior of the reactor with nitrogen, the temperature was raised to 90° C. with stirring. Then, a monomeric mixture of n-butyl acrylate (95.4 g), tris(2-hydroxyethyl)isocyanuric acid triacrylate (1.8 g), -mercaptopropyldimethoxysilane (2.3 g) and 2,2'-azobisisobutyronitrile (hereinafter referred to as "AIBN") (5.0 g) was dropwise added in a nitrogen atmosphere over 2 hours. AIBN (each 0.25 g) dissolved in 4 time weight acetone was added after 15 and 30 minutes from the completion of the addition of the mixture. Thereafter, the reaction was continued for further 30 minutes with stirring to obtain a transparent pale yellow viscous liquid polymer with viscosity of 460 poise (23° C.). Gas chromatographic analysis (hereinafter referred to as "GC analysis") revealed that the amount of the residual monomer was 0.6%.

To the thus produced polymer (100 g), glue type calcium carbonate treated with a fatty acid (120 g), titanium oxide (30 g), dioctyl phthalate (60 g), hydrogenated caster oil (6 g), styrenated phenol (1 g) and a benzotriazol type ultraviolet light absorbing agent (1 g) were added and kneaded by passing the mixture through three roll paint rolls. Then, the kneaded mixture was thoroughly mixed with a curing mixture of dibutyltin caprylate (3 g) and laurylamine (1 g).

According to JIS (Japanese Industrial Standards) A-5758, a II type test piece with an H shape was produced and examined for its tensile strength. Modulus at 150% elongation (hereinafter referred to as "$M_{150}$"), 2.8 kg/cm$^2$; strength at break (hereinafter referred to as "$T_B$"), 5.8 kg/cm$^2$; elongation at break (hereinafter referred to as "$E_B$"), 580%.

EXAMPLES 2 to 4

In the same manner as in Example 1 but using a monomeric mixture having a composition and a organic polymer having reactive silicone groups and polymerizable ehylenically unsaturated groups shown in Table 1, the reaction was carried out to obtain a polymer. The tensile properties of the cured polymer were measured in the same manner as in Example 1. The results are shown in Table 1, wherein a unit of the amounts of the compounds is gram.

TABLE 1

| | Example No. | | |
|---|---|---|---|
| Organic polymer*[1] | 2<br>1 | 3<br>1 | 4<br>1 |
| Monomeric mixture | | | |
| n-Butyl acrylate | 93.7 | 97.2 | 92.1 |
| γ-Mercaptopropyldimethoxysilane | 3.5 | 2.3 | 5.3 |
| Neopentylglycol diacrylate | 2.1 | — | — |
| Tris(2-hydroxyethyl)isocyanuric acid triacrylate | — | — | 2.1 |
| AIBN | 0.5 | 0.5 | 0.5 |
| Viscosity (poise, 23° C.) | 310 | 570 | 620 |
| $M_{150}$ (kg/cm$^2$) | 2.9 | 2.7 | 2.6 |
| $T_B$ (kg/cm$^2$) | 6.1 | 6.2 | 5.8 |
| $E_B$ (%) | 580 | 570 | 620 |
| Failure | Cohesive failure | | |

Note
*[1] No. of Preparation Example

EXAMPLE 5

To a reactor, a polymer having on the average 1.2 reactive silicone group of the formula:

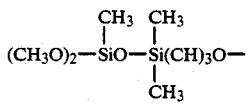

and 0.6 ethylenically unsaturated group of the formula:

$CH_2=CHCH_2O-$ (100 g) was charged and evacuated under reduced pressure. After replacing the interior of the reactor with nitrogen, the temperature was raised to 90° C. with stirring. Then, a monomeric mixture of n-ethylhexyl acrylate (95.4 g), 1,6-hexanediol diacrylate (2.20 g), γ-mercaptopropyldimethoxysilane (3.5 g) and AIBN (0.5 g) was dropwise added in a nitrogen atmosphere over 2 hours. AIBN (each 0.25 g) dissolved in 4 time weight acetone was added after 15 and 30 minutes from the completion of the addition of the mixture. Thereafter, the reaction was continued for further 30 minutes with stirring to obtain a transparent pale yellow viscous liquid polymer. $M_{150}=3.2$ kg/cm$^2$. $T_B=6.1$ kg/cm$^2$. $E_B=560\%$.

EXAMPLES 6 to 8

In the same manner as in Example 1 but using a monomeric mixture having a composition shown in Table 2, the reaction was carried out to obtain a polymer. The tensile properties of the polymer were measured in the same manner as in Example 2. The results are shown in Table 2.

COMPARATIVE EXAMPLE

In the same manner as in Example 1 but using, as a propyleneoxide polymer, one having on the average 1.6 reactive silicone groups and no ethylenically unsaturated group per molecule and, as a monomeric mixture, a mixture of n-butyl acrylate (92.2 g), γ-methacryloxypropyldimethoxysilane (2.8 g) and AIBN (5.0 g), the reaction was carried out to obtain a sightly opaque pale yellow viscous liquid polymer with viscosity of 380 poise (23° C.).

GC analysis revealed that the amount of the residual monomer was 0.5%.

The tensile properties of the cured polymer were measured in the same manner as in Example 1. $T_B=3.9$ kg/cm$^2$. $E_B=180\%$. $E_B$ was inferior to the cured polymer of Examples.

TABLE 2

| | Example No. | | |
|---|---|---|---|
| | 6 | 7 | 8 |
| Monomeric mixture | | | |
| n-Butyl acrylate | 93.7 | 97.2 | 92.1 |
| γ-Methacryloxypropyldimethoxysilane | 3.5 | 2.3 | 5.3 |
| Tris(2-hydroxyethyl)isocyanuric acid triacrylate | 2.7 | — | — |
| Azo compound initiator*[1] | 4.5 | 4.5 | — |
| Peroxide compound initiator*[2] | — | — | 5.5 |
| Viscosity (poise, 23° C.) | 530 | 490 | 410 |
| $M_{150}$ (kg/cm$^2$) | 2.7 | 2.9 | 2.8 |
| $T_B$ (kg/cm$^2$) | 5.8 | 5.6 | 5.8 |
| $E_B$ (%) | 540 | 480 | 470 |
| Failure | Cohesive failure | | |

Note

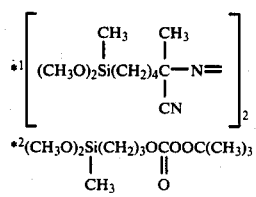

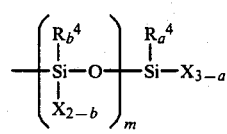

What is claimed is:

1. A polymer which is prepared by addition polymerizing at least one ethylenically unsaturated monomer in the presence of:
   (A) an organic polymer having a reactive silicone group of the formula:

$$\left[\begin{array}{c} R_b^4 \\ | \\ Si-O \\ | \\ X_{2-b} \end{array}\right]_m \begin{array}{c} R_a^4 \\ | \\ Si-X_{3-a} \\ | \\ \end{array} \quad (I)$$

wherein $R^4$ is a $C_1$–$C_{20}$ alkyl group, a $C_6$–$C_{20}$ aryl, a $C_7$–$C_{20}$ aralkyl group or a triorganosiloxane group of the formula:

$(R'')_3SiO-$ in which $R''$ is, the same or different, a $C_1$–$C_{20}$ hydrocarbon group, X is a hydroxyl group or, the same or different, a hydrolyzable group, a is an integer of 0 to 3, b is 0, 1 or 2 and m is an integer of 1 to 18 and a polymerizable ethylenically unsaturated group in a molecule, the total number of the reactive silicone group and the unsaturated group in a molecule being on the average not less than 1.1 and the number of the ethylenically unsaturated group being on the average not less than 0.1 and said polymer being selected from the group consisting of a polyalkyleneoxide, a polyester and a ether-ester block copolymer, and
   (B) at least one component selected from the group of consisting of a radical polymerization initiator having a reactive silicone group (I), a chain transfer agent having a reactive silicone group (I) and a mixture thereof.

2. A polymer according to claim 1, wherein the the polymer is prepared by addition polymerizing 100 parts by weight of the ethylenically unsaturated monomer in the presence of:
   (A) 10 to 1,000 parts by weight of the organic polymer having a reactive silicone group, and
   (B) 0.01 to 20 parts by weight of the component selected from the group of consisting of a radical polymerization initiator having a reactive silicone group (I), a chain transfer agent having a reactive silicone group (I) and a mixture thereof.

3. A polymer according to claim 1, wherein the organic polymer is a polyalkyleneoxide having a main chain comprising repeating units of the formula:

$$-R^1-O-\qquad\qquad (XI)$$

wherein $R^1$ is a $C_1-C_8$ divalent hydrocarbon group.

4. A polymer according to claim 2, wherein the organic polymer has at least one reactive terminal silicone group and a molecular weight of 3,000 to 15,000.

5. A polymer according to claim 1, wherein the ethylenically unsaturated monomer is at least one monomer selected from the group consisting of an ethylenically unsaturated compound of the formula:

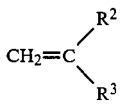

(XII)

wherein $R^2$ is a hydrogen atom, a halogen atom or a substituted or unsubstituted $C_1-C_{10}$ monovalent hydrocarbon group, and $R^3$ is a hydrogen atom, a halogen atom, a substituted or unsubstituted $C_1-C_{10}$ monovalent hydrocarbon group, a substituted or unsubstituted monovalent aromatic group, an alkenyl group, a carboxyl group, an acyloxy group, an alkoxycarbonyl group, a nitrile group, a pyridyl group, an amide group or a glycidoxy group, and an ethylenically unsaturated compound of the formula:

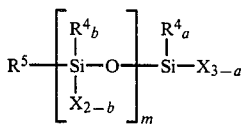

(XIII)

wherein $R^4$, X, a, b and m are the same as defined above, and $R^5$ is an organic group having an ethylenically unsaturated group.

6. A polymer according to claim 5, wherein the ethylenically unsaturated compound (XII) is an acrylate or methacrylate monomer of the formula:

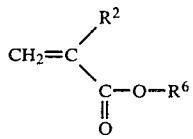

(XIV)

wherein $R^2$ is the same as defined above and $R^6$ is a substituted or unsubstituted $C_1-C_{20}$ monovalent aliphatic or aromatic group.

7. A polymer according to claim 1, wherein the polymerizable ethylenically unsaturated group is a group of the formula:

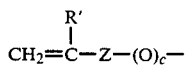

(II)

wherein Z is a divalent $C_1-C_{40}$, R' is a hydrogen atom or the substituted or unsubstituted $C_1-C_{20}$ organic group, and c is 0 or 1.

8. A polymer according to claim 1, wherein the radical initiator having the reactive silicone group is an azo or peroxide.

9. A polymer according to claim 1, wherein the chain transfer agent having the reactive silicone group is at least one compound of the formulas:

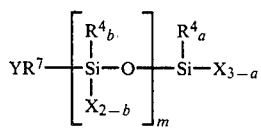

(XVI)

and

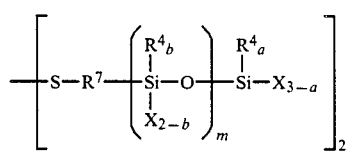

(XVII)

wherein $R^4$, X, a, b and m are the same as defined above, and $R^7$ is a divalent hydrocarbon group excluding unsaturated $C_1-C_{20}$ hydrocarbon groups and Y is a group which imparts a chain transfer constant larger than $10^{-3}$ to the compound (XVI) and is to be activated by a free radical.

10. A polymer according to claim 1, wherein the hydrolyzable group X is a group selected from the group consisting of a halogen atom, a hydride group, an alkoxy group, an acyloxy group, a ketoximate group, a mercapto group and an alkenyloxy group.

11. A polymer according to claim 10, wherein the hydrolyzable group X is an alkoxy group.

12. A polymer according to claim 9, wherein the group Y is a mercapto group.

13. A composition comprising a polymer according to claim 1.

14. A cured product of a polymer according to claim 1.

* * * * *